(12) United States Patent
Rad et al.

(10) Patent No.: US 10,098,027 B2
(45) Date of Patent: Oct. 9, 2018

(54) METHODS AND APPARATUS FOR INTERCEPTING AND ANALYZING SIGNALS EMITTED FROM VEHICLES

(71) Applicant: Anatrope, Inc., Sterling, VA (US)

(72) Inventors: Tiffany Strauchs Rad, Ashburn, VA (US); Drew James Newman, Carson City, NV (US); Teague James Newman, Carson City, NV (US)

(73) Assignee: Anatrope, Inc., Sterling, VA (US)

( * ) Notice: Subject to any disclaimer, the term of this patent is extended or adjusted under 35 U.S.C. 154(b) by 23 days.

(21) Appl. No.: 15/610,963

(22) Filed: Jun. 1, 2017

(65) Prior Publication Data

US 2017/0353879 A1    Dec. 7, 2017

Related U.S. Application Data

(60) Provisional application No. 62/343,912, filed on Jun. 1, 2016.

(51) Int. Cl.
*H04W 24/08* (2009.01)
*H04L 12/26* (2006.01)
*H04W 84/18* (2009.01)
*H04W 4/70* (2018.01)

(52) U.S. Cl.
CPC ............. *H04W 24/08* (2013.01); *H04L 43/08* (2013.01); *H04L 43/0894* (2013.01); *H04W 4/70* (2018.02); *H04W 84/18* (2013.01)

(58) Field of Classification Search
CPC ..... H04W 4/005; H04W 84/18; H04W 24/08; H04W 4/00; H04W 43/08; H04W 43/0894; H04W 4/70; H04L 43/0894; H04L 43/08
See application file for complete search history.

(56) References Cited

U.S. PATENT DOCUMENTS

| 6,052,068 | A | 4/2000 | Price R-W et al. |
| 6,469,621 | B1 | 10/2002 | Vredevoogd et al. |
| 6,476,715 | B1 | 11/2002 | Bromer |
| 7,251,574 | B1* | 7/2007 | Bhattacharya ..... G01R 31/3171 398/158 |
| 8,862,150 | B2 | 10/2014 | Phillips et al. |
| 8,892,132 | B2 | 11/2014 | Monks et al. |
| 8,896,430 | B2 | 11/2014 | Davidson et al. |

(Continued)

OTHER PUBLICATIONS

International Search Report dated Sep. 8, 2017, for PCT Application No. PCT/US2017/35487, filed on Jun. 1, 2017, 2 pages.

(Continued)

*Primary Examiner* — Phong La
(74) *Attorney, Agent, or Firm* — Cooley LLP

(57) ABSTRACT

In some embodiments, an apparatus includes a memory, a processor operatively coupled to the memory and a sensor. The sensor is configured to intercept a wireless signal associated with a vehicle. The processor configured to identify from the wireless signal (1) a bit rate of the wireless signal, (2) an encoding type associated with the wireless signal, and (3) data associated with the wireless signal. The processor configured to generate an identifier associated with the vehicle based on the bit rate, the encoding type and the data. The processor configured to correlate within the memory the identifier with additional data associated with a user of the vehicle.

19 Claims, 2 Drawing Sheets

(56) References Cited

U.S. PATENT DOCUMENTS

| | | |
|---|---|---|
| 8,896,438 B2 | 11/2014 | Emigh et al. |
| 8,902,082 B2 | 12/2014 | Roesner |
| 8,909,463 B2 | 12/2014 | Chapman et al. |
| 8,952,814 B2 | 2/2015 | Lupoli et al. |
| 8,963,688 B2 | 2/2015 | Fenkanyn et al. |
| 9,020,687 B2 | 4/2015 | Mendelson |
| 9,030,153 B2 | 5/2015 | Littrell |
| 9,043,124 B1 | 5/2015 | Tran et al. |
| 9,047,522 B1 | 6/2015 | Nikitin et al. |
| 9,058,747 B2 | 6/2015 | Bianco |
| 2002/0061073 A1* | 5/2002 | Huang .............. H04L 1/0003 375/295 |
| 2002/0075145 A1 | 6/2002 | Hardman et al. |
| 2003/0162536 A1* | 8/2003 | Panico .............. G08G 1/14 455/456.3 |
| 2005/0177858 A1* | 8/2005 | Ueda .............. G11B 27/105 725/105 |
| 2006/0048567 A1* | 3/2006 | Shimura .......... B60C 23/0408 73/146.5 |
| 2006/0129691 A1* | 6/2006 | Coffee .............. H04L 67/04 709/230 |
| 2007/0189242 A1* | 8/2007 | Hosokawa ........ H04B 1/0475 370/338 |
| 2008/0071882 A1 | 3/2008 | Hering et al. |
| 2008/0310611 A1* | 12/2008 | Moriwaki ........ H04W 36/0033 379/212.01 |
| 2010/0070168 A1* | 3/2010 | Sumcad .......... G01C 21/3438 701/467 |
| 2011/0021234 A1* | 1/2011 | Tibbitts .............. H04W 48/04 455/517 |
| 2011/0193961 A1* | 8/2011 | Peterson .............. B60R 1/00 348/148 |
| 2012/0029767 A1 | 2/2012 | Bailie et al. |
| 2013/0038440 A1* | 2/2013 | Deniau .............. B60C 23/0455 340/447 |
| 2013/0157729 A1* | 6/2013 | Tabe .............. H04W 52/0245 455/573 |
| 2013/0158778 A1* | 6/2013 | Tengler .......... G08G 1/096716 701/31.5 |
| 2014/0213176 A1 | 7/2014 | Mendelson |
| 2015/0222490 A1* | 8/2015 | Salam .............. H04L 67/2809 709/224 |
| 2015/0278038 A1* | 10/2015 | Halker .............. G06F 11/20 714/3 |
| 2016/0232565 A1* | 8/2016 | Goergen .......... G06Q 30/0255 |
| 2016/0371481 A1* | 12/2016 | Miyake .............. G06F 21/445 |
| 2017/0021760 A1* | 1/2017 | Calnek .............. H04W 4/02 |
| 2017/0067747 A1* | 3/2017 | Ricci .............. G01C 21/3415 |
| 2017/0093643 A1* | 3/2017 | Ricci .............. H04L 41/14 |
| 2017/0116790 A1* | 4/2017 | Kusens .............. G07B 15/02 |
| 2017/0126648 A1* | 5/2017 | Bond .............. G06F 9/542 |
| 2017/0180480 A1* | 6/2017 | Yang .............. H04L 12/185 |
| 2017/0203767 A1* | 7/2017 | Tibbitts .............. B60W 40/09 |
| 2017/0214624 A1* | 7/2017 | Grob-Lipski .......... H04L 47/24 |
| 2017/0222847 A1* | 8/2017 | Feher .............. H04L 25/4917 |

OTHER PUBLICATIONS

Written Opinion of the International Searching Authority dated Sep. 8, 2017, for PCT Application No. PCT/US2017/35487, filed on Jun. 1, 2017, 5 pages.

* cited by examiner

METHODS AND APPARATUS FOR INTERCEPTING AND ANALYZING SIGNALS EMITTED FROM VEHICLES

CROSS-REFERENCE TO RELATED APPLICATIONS

This application claims priority to and the benefit of U.S. Provisional Patent Application No. 62/343,912, filed Jun. 1, 2016 and titled "Methods and Apparatus for Intercepting and Analyzing Signals Emitted from Vehicles," which is incorporated herein by reference in its entirety.

BACKGROUND

Some embodiments described herein relate to systems and methods for remotely identifying vehicles using signals emitted from vehicles. Moreover, some embodiments described herein also relate to systems and methods for identifying vehicles and associated unique identifiers (IDs). Some embodiments described herein may or may not use PII (personally identifiable information).

Some known systems that currently collect IDs associated with vehicles use specialized single-purpose devices placed in vehicles. Such known systems can also include readers or receivers that operate using radio frequency (RF) signals to read such specialized single-purpose in-vehicle devices as they pass a reader or receiver. Placing an RF device in a vehicle can place an additional burden on the user of the vehicle and reduces the number of vehicles that can be detected.

Thus, a need exists for improved devices and methods for vehicle identification using signals emitted from vehicles.

SUMMARY

In some embodiments, an apparatus includes a memory, a processor operatively coupled to the memory and a sensor. The sensor is configured to intercept a wireless signal associated with a vehicle. The processor configured to identify from the wireless signal (1) a bit rate of the wireless signal, (2) an encoding type associated with the wireless signal, and (3) data associated with the wireless signal. The processor configured to generate an identifier associated with the vehicle based on the bit rate, the encoding type and the data. The processor configured to correlate within the memory the identifier with additional data associated with a user of the vehicle.

DETAILED DESCRIPTION

In some embodiments, an apparatus includes a receiver to receive and/or intercept one or more signals transmitted by a transmitter of a vehicle. The receiver can decode the signals and, based on the signals, determine a unique identifier for the vehicle. Based on the unique identifier, the receiver can determine unique characteristics associated with the vehicle, the user of the vehicle and/or the like.

In some embodiments, a system can include a wireless receiver that can be used to receive RF signals, cellular signals, Bluetooth® wireless device signals, close or long range signals, radio signals and/or the like emanating from a vehicle. The signal is received by one or more deployed receivers (e.g., RF receivers). The system is capable of operating either indoors or outdoors. Receipt and decoding of the vehicle's signal can additionally be used, for example, to initiate telematics or other applications using an association with the vehicle identifier, to determine if an ID has entered or exited a geo-fenced area, for business intelligence associated with targeted marketing and advertising, and/or the like.

As used herein, the term vehicle refers to any device used for transportation including, for example, planes, drones, trains, passenger cars, light duty trucks, medium duty trucks, heavy duty trucks, vans, buses, motorcycles, marine and aquatic vessels, bicycles, scooters, and/or the like.

As used herein, examples of encoding type can include Manchester encoding, phase encoding (PE), differential Manchester encoding, non-return to zero (NRZ) encoding, return to zero (RZ) encoding, non-return to zero inverted (NRZ-I) encoding, 4B/5B encoding, 5B/6B encoding, 8B/6T encoding, 8B/10B encoding, multi-level transition 3 (MLT-3) encoding, pulse amplitude modulation 5 (PAM-5) encoding, and/or the like.

As used herein, personally identifiable information (PII) can include, for example, any information that directly identifies an individual's name, address, financial information (credit card numbers, bank account numbers, etc.), identifiers associated with the individual (e.g., Social Security Numbers, drivers license number, etc.), and/or any other information that is directly attributable to their identity. In some instances, collection, storage and/or use of PII can depend on the driver's or user's opt-in for rewards programs, preferences and/or the like. In such instances, collection of PII may be optionally associated with a vehicle ID per permissions from the driver or user. Where PII is collected, it can be correlated to a vehicle ID, as described in further detail herein. In other instances, PII is not collected.

Figure 1:
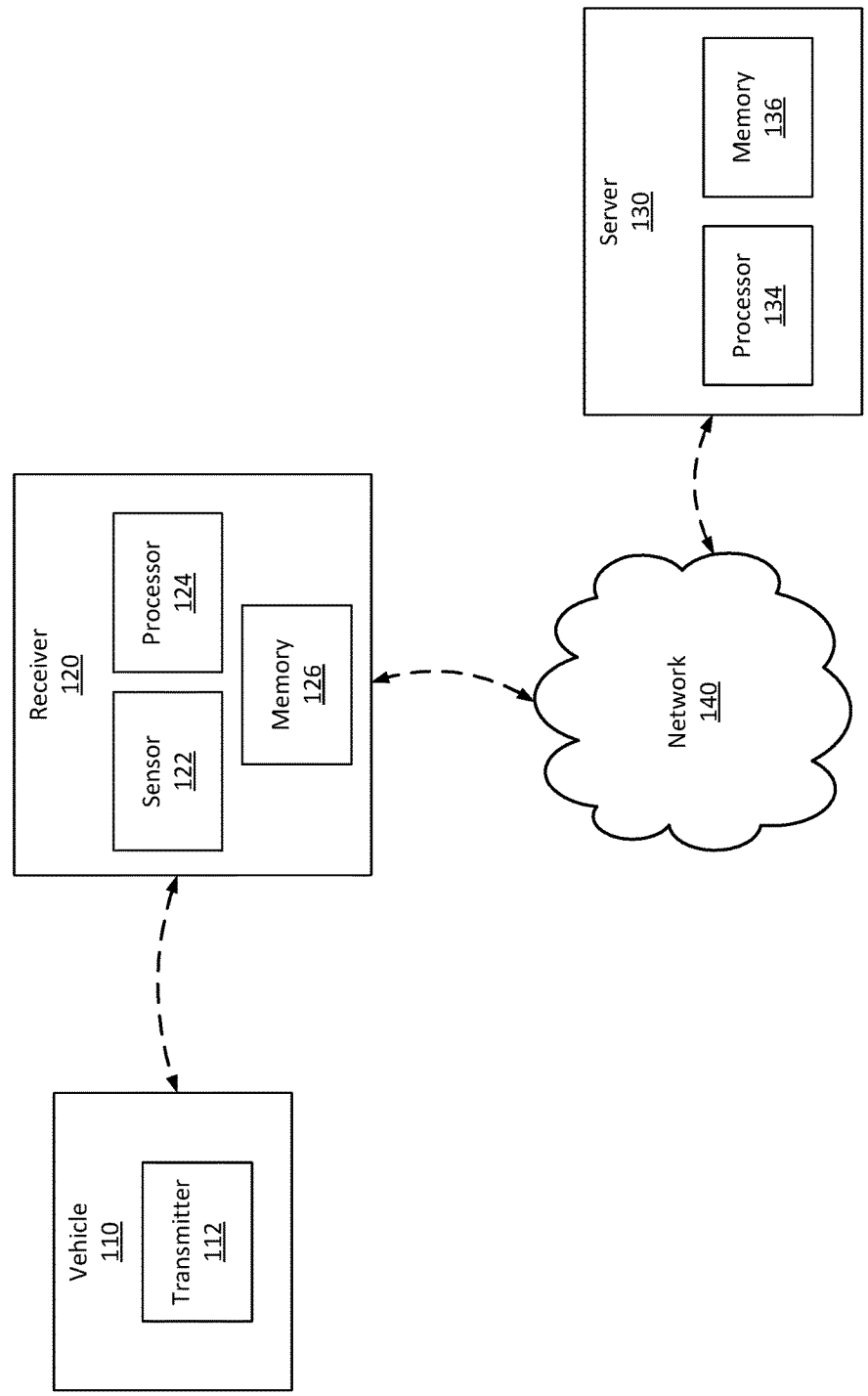
FIG. 1 is a block diagram of a system for capturing a vehicle's signal and defining a vehicle ID, according to an embodiment.

FIG. 1 is a block diagram of a system 100 for capturing a vehicle's signal, according to an embodiment. System 100 includes a vehicle 110, a receiver 120, a network 140 and a server 130. The vehicle 110 includes a transmitter 112. The transmitter 112 can be any suitable device that transmits and/or emits a wireless signal. For example, the transmitter 112 can include an antenna configured to transmit and/or emit a wireless signal. In some instances, the transmitter 112 can be a device to monitor aspects of the vehicle 110 (e.g., a tire pressure monitoring system (TPMS) sensor, etc.), a device to provide wireless data connections associated with the vehicle (e.g., a Wi-Fi® access point, a Bluetooth® transmitter, a short range radio frequency identifier (RFID) transmitter, etc.), a device to provide vehicle-to-vehicle communication, a device to provide vehicle-to-infrastructure communication, a device to provide toll information (e.g., EZ Pass®, etc.), and/or any other suitable device that transmits a signal associated with the vehicle 110. In some instances, the transmitter 112 is native to the vehicle and/or is installed for a purpose other than transmitting signals to the receiver 120 (as described in further detail herein). In other instances, the transmitter 112 is installed for the purpose of transmitting signals to the receiver 120. In some instances, the transmitter 112 can transmit a signal using a frequency of between about 315 MHz and about 433 MHz. In other instances, the transmitter 112 can transmit a signal within any suitable frequency range. While described as a transmitter, in some instances, the transmitter 112 can be a transceiver configured to both send and receive signals.

The receiver 120 includes a sensor 122, a processor 124 and a memory 126. The receiver 120 can be any suitable device configured to intercept and/or receive and process signals emitted by the transmitter 112 of the vehicle 110. In some instances, the receiver 120 can be disposed within a predetermined proximity of where the vehicle 110 will likely be. Such a predetermined proximity can be based on a likely range of the signal transmitted by transmitter 122 such that the receiver 120 can receive the signal, as discussed in further detail herein. In other instances, the receiver 120 can receive the signal from the transmitter 112 using any number of intermediate receivers and/or nodes (not shown in FIG. 1). While described as a receiver, in some instances, the receiver 120 can be a transceiver configured to both send and receive signals. In some instances, the receiver 120 can be disposed on a stationary object (e.g., a billboard, a traffic light, outside a retail establishment, etc.). In other instances, the receiver can be disposed on a vehicle (different from the vehicle 110) such as, for example, a drone, an automobile, and/or the like.

The sensor 122 can be configured to intercept and/or receive the wireless signal transmitted by the transmitter 112 of the vehicle 110. Thus, the sensor 122 can include an antenna tuned to one or more frequencies at which transmitter 112 transmits signals. Additionally, in some instances, the sensor 122 can be within communication range of the transmitter 112. In other instances, the sensor 122 can receive the signal from the transmitter 112 using any number of intermediate receivers and/or nodes (not shown in FIG. 1) and/or via an intermediate network (not shown in FIG. 1). In some instances, the signal transmitted from the transmitter 112 may not be intended to be intercepted by the sensor 122. Similarly stated, the signal transmitted by the transmitter 112 may be intended and/or transmitted for a purpose other than being received by the sensor 122. In other instances, the transmitter 112 can be installed with the purpose of transmitting signals to the receiver 120. In such other instances, transmitting signals to the receiver 120 can be an intended function of the transmitter 112.

The processor 124 can be any suitable processor configured to control the operations associated with the receiver 120. For example, the processor 124 can be configured to control the sensor 122 (e.g., provide parameters for data gathering to the sensor 122, adjust parameters associated with the antenna of the sensor 122 such as antenna angle, frequency tuning, etc., and/or the like), process data received by the sensor 122, execute code stored in the memory 126, transmit data and/or images via the network 140, and/or the like. In some embodiments, the processor 124 can be a general purpose processor, a Field Programmable Gate Array (FPGA), an Application Specific Integrated Circuit (ASIC), a Digital Signal Processor (DSP), and/or the like.

The memory 126 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some instances, the memory 126 includes data associated with operation of the receiver 120. In some instances, the memory 126 stores instructions to cause the processor 124 to execute modules, processes and/or functions associated with controlling the sensor 122, gathering data associated with the sensor 122, transmitting data and/or images associated with the vehicle to the server 130, and/or the like. In some instances, the memory 126 can store data received from the transmitter 112, data processed by the processor 124, and/or the like.

The network 140 can be any suitable network between the receiver 120 and the server 130. As such, the network 140 can be used to transfer data between the receiver 120 and the server 130. The network 140 can be any type of network (e.g., a local area network (LAN), a wide area network (WAN), a virtual network, a Wi-Fi® network, a telecommunications network, etc.) implemented as a wired network and/or wireless network. In some instances, the receiver 120 can communicate with the server 130 and the network 120 via intermediate networks and/or alternate networks. Such intermediate networks and/or alternate networks can be of a same type and/or a different type of network as network 140.

The server 130 can be any suitable communication device that can communicate with the receiver 120 via network 140. The server 130 includes a memory 136 and a processor 134. The processor 134 can be any suitable processor configured to control the operations associated with the server 130. For example, the processor 134 can be configured to receive data from the receiver 120, process data received from the receiver 120, identify correlations based on the data received from the receiver 120 and/or stored in the memory 136, execute code stored in the memory 136, and/or the like. In some embodiments, the processor 134 can be a general purpose processor, a Field Programmable Gate Array (FPGA), an Application Specific Integrated Circuit (ASIC), a Digital Signal Processor (DSP), and/or the like.

The memory 136 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some instances, the memory 136 includes data associated with operation of the server 130. In some instances, the memory 136 stores instructions to cause the processor 134 to execute modules, processes and/or functions associated with receiving data from the receiver 120, processing data received from the receiver 120, identifying correlations based on the data received from the receiver 120, generating reports associated with the data received from the receiver, and/or the like. In some instances, the memory 136 can store data received from the receiver 120, data processed by the processor 134, data to be correlated with vehicle IDs, and/or the like. In some instances, such data can be stored in a database (not shown in FIG. 1) alternatively or in addition to storing the data in memory 136.

In use, the vehicle 110 comes into a predetermined proximity of sensor 122. The transmitter 112 can transmit signals from the vehicle. For example, if transmitter 112 is part of a TPMS sensor, the transmitter 112 can transmit signals related to tire pressure. For another example, if the transmitter 112 is part of a Bluetooth® system, the transmitter 112 can transmit Bluetooth® data signals.

The sensor 122 can sense and/or receive the signal transmitted by the transmitter 112. Based on this signal, the receiver 120 can process the signal to identify and/or define a unique vehicle ID for the vehicle 110, as described in further detail herein with respect to FIG. 2. In other instances, the receiver 120 can send the data associated with the received signal to the server 130 via network 140. The server 130 can then process the data to identify and/or define the unique vehicle ID. The server can then correlate this information (e.g., the unique vehicle ID) with business intelligence collected for a multitude of business applications. Examples include parking and/or toll fee collection, targeted marketing and advertising, physical and security uses, and/or the like.

In some instances, for example, when vehicle 110 nears (e.g., comes within a predetermined proximity of) a billboard, signage, and/or or the like, an advertisement on the billboard or signage can be customized to the operator of the vehicle 110. For example, the unique ID derived from the vehicle can be correlated and/or associated with (e.g., within a database at receiver 120 and/or server 130) demographic information associated with the operator of the vehicle 110. Based on this demographic information, a targeted advertisement can be selected and a signal sent to the billboard and/or signage to present the targeted advertisement. Examples include signs on the sides of buses, billboard road signs, advertising on displays in gas stations, messages sent to a phone or to a display in vehicle 110, and/or the like.

In other instances, for example, when vehicle 110 nears (e.g., comes within a predetermined proximity of) a receiver 120, a customer reward program(s) can be customized to the operator of the vehicle 110. For example, the unique ID derived from the vehicle can be correlated and/or associated with (e.g., within a database at receiver 120 and/or server 130) customer reward program information and/or past order history associated with a operator of the vehicle. For example special offers can be presented to drivers who near restaurants for which that user has subscribed to a customer reward program. For another example, if the customer has subscribed to a rewards programs, the customer's preferred items or commonly ordered items and/or customer's name can be populated in the quick service restaurant's database before the customer arrives at the ordering kiosk or window.

In still other instances, for example, when vehicle 110 nears (e.g., comes within a predetermined proximity of) a receiver 120, customer reward programs can be customized to the driver. Examples include presenting special offers to drivers who are near gas stations. For example, drivers can receive special offers and/or have their fuel purchase automatically uploaded to their rewards program account without having to scan a rewards card or enter an ID number. In such examples, the unique ID derived from the vehicle can be correlated and/or associated with (e.g., within a database at receiver 120 and/or server 130) reward program account information, fuel purchase history, and/or the like. For example, after identifying a reward program account based on the vehicle ID, the system can update the reward program account (e.g., in a database) based on a current purchase.

In yet other instances, when vehicle 110 nears (e.g., comes within a predetermined proximity of) a receiver 120 near restaurants, grocery stores, and/or similar shopping areas, special offers to a driver of the vehicle 110 can be provided by the restaurants, grocery stores, and/or similar shopping areas. For another example, the driver's purchases can be automatically uploaded to their rewards program account without having to scan a rewards card or enter an ID number (e.g., where the driver's rewards program information is correlated and/or associated with the vehicle's unique ID).

In other instances, when vehicle 110 nears a receiver 120, access can be granted into gated communities for tenants without having to add additional hardware to the vehicle 110. In such instances, the unique ID derived from the vehicle 110 can be correlated and/or associated with (e.g., within a database at receiver 120 and/or server 130) access to the gated community. After the receiver 120 and/or server 130 processes and verifies that the unique ID is associated with access to the gated community, the receiver 120 and/or server 130 can send a signal to cause a gate to the gated community to open.

In other instances, when vehicle 110 nears a receiver 120 in a parking garage, a property owner can derive information regarding when a customer entered and existed the parking garage without needing to add hardware into a car or rely upon parking tickets distributed at the entrance. For example, based on a receiver at the entrance and exit of the parking garage, the unique ID can be received and correlated with a time stamp (e.g., within a database) each time the vehicle enters and exits the parking garage. Additionally, if the customer has subscribed to a payment system for the parking garage, payment can be processed automatically as vehicle 110 exits and passes receiver 120. In such instances, account information can be correlated and/or associated with (e.g., within a database at receiver 120 and/or server 130) account and/or billing information. Based on the account and/or billing information, a user can be automatically charged for parking within the parking garage based on their entrance and exit times.

In such instances, a method of using a receiver within a parking area can include scanning the entrance and/or exit of a parking area (e.g., with a receiver) for a vehicle ID and determining a location of a parked vehicle using a vehicle ID. This information can be used, for example, to determine a fee for the user to park within the parking area. In some instances, the system can receive a signal from the vehicle, identify the vehicle based on past signals, correlate the vehicle with a user based on an association in a database, and/or notify the user if the user has subscribed to a client's services, such as a rewards program, or has installed a computer program or phone application that notifies the user of information such as targeted marketing and advertising or that a particular vehicle ID has neared the proximity of a receiver.

In other instances, the receiver 120 can be included within and/or attached to a vehicle (e.g., vehicle 110 and/or other vehicle(s)). In such instances, when a vehicle with a receiver 120 nears other vehicle(s) 110 on a roadway or in a parking area or structure, the proximity and/or location of the other vehicle(s) 110 can be determined (e.g., by the sensor 122 receiving signals from one or more transmitters 112 on the vehicles(s) 110) thus contributing to navigational and/or driving data associated with location and/or proximity between manually driven vehicles, autonomous vehicles, and/or semi-autonomous vehicles. Such signals can provide autonomous and/or semi-autonomous vehicles with another data point to improve navigation and driving. For manually-driven cars, this provides data points associated with other vehicles in close proximity and can, for example, provide a warning if a vehicle becomes too close, thus potentially preventing an accident. Additionally, the receiver 120 in the vehicle can obtain unique IDs for nearby vehicles. Such a unique ID can potentially be useful, for example, to identify another vehicle in an accident such as a hit-and-run car accident.

In other instance, when vehicle 110 enters a perimeter established with receiver(s) 120, an alert system can notify a property owner or manager of the existence of vehicle 110 along with time/date stamps of when vehicle 110 was identified within the perimeter. In addition, a database can correlate and/or associate the vehicle's unique ID with a history of the presence of vehicle 110 within that perimeter.

In other instances, when vehicle 110 nears a receiver 120 near a country border or a boundary established by placing receivers 120 around a geographic location and/or around a building or property, the unique ID derived from the vehicle 110 can be correlated and/or associated with stored data (e.g., within a database at receiver 120 and/or server 130) to either grant or deny access to cross the border or boundary. Such stored data can include, for example, historical data associated with the unique ID (e.g., criminal history associated with a user or owner of the vehicle associated with the unique ID), data associated with an identity of a user or owner of the vehicle associated with the unique ID, visa or citizenship information associated with the user or owner of the vehicle associated with the unique ID, and/or the like.

In other instances, data can be collected when vehicle 110 nears receivers 120 placed in geographic locations within a geographic area (e.g., around a town or city). Thus, if an event occurs, law enforcement and/or government intelligence can correlate the vehicles 110 in the area of the event with prior data collected by the receivers 120. The unique IDs derived from vehicles 110 within the area of an event can be correlated and/or associated with (e.g., within a database at receiver 120 and/or server 130) stored data (e.g., data collected by the receivers 120 within the geographic area). Accordingly, a "pattern of life" for vehicle 110 can be defined and/or created based on the data collected by the receivers 120 within the geographic area, indicating where the vehicle 110 traveled prior to the event and/or after the event.

As discussed above, in some instances, the receiver 120 can be included within and/or attached to a vehicle (e.g., vehicle 110 and/or another vehicle). In some instances, vehicle(s) 110 with receiver(s) 120 can be travelling together in a caravan and/or entourage of vehicles. In such instances, the vehicle IDs of the vehicles in the caravan and/or entourage of vehicles can be stored and registered (e.g., within a database at the receiver(s) 120 and/or server 130) as authorized members of the caravan and/or entourage of vehicles. If, for example, a vehicle not registered as a member of the caravan and/or entourage of vehicles is identified by a receiver 120 in a vehicle of a member of the caravan and/or entourage of vehicles as following the caravan and/or entourage of vehicles on a roadway for a period of time (e.g., by calculating a unique ID for the vehicle following the caravan based on data collected from the vehicle by the receiver 120 and comparing the unique ID for the vehicle to the registered unique IDs in the database), the proximity, location, and/or unique ID of the following vehicle(s) can be determined. A warning can be issued to the caravan and/or entourage leader and/or the caravan's and/or entourage's security that a vehicle having a unique ID not registered as a member of the caravan and/or entourage of vehicles is following the caravan and/or entourage of vehicles and the ID of the vehicle can also be queried against a database at the receiver(s) 120 and/or sever 130 to identify additional information and/or history about the vehicle and/or a user associated with the vehicle.

Figure 2:
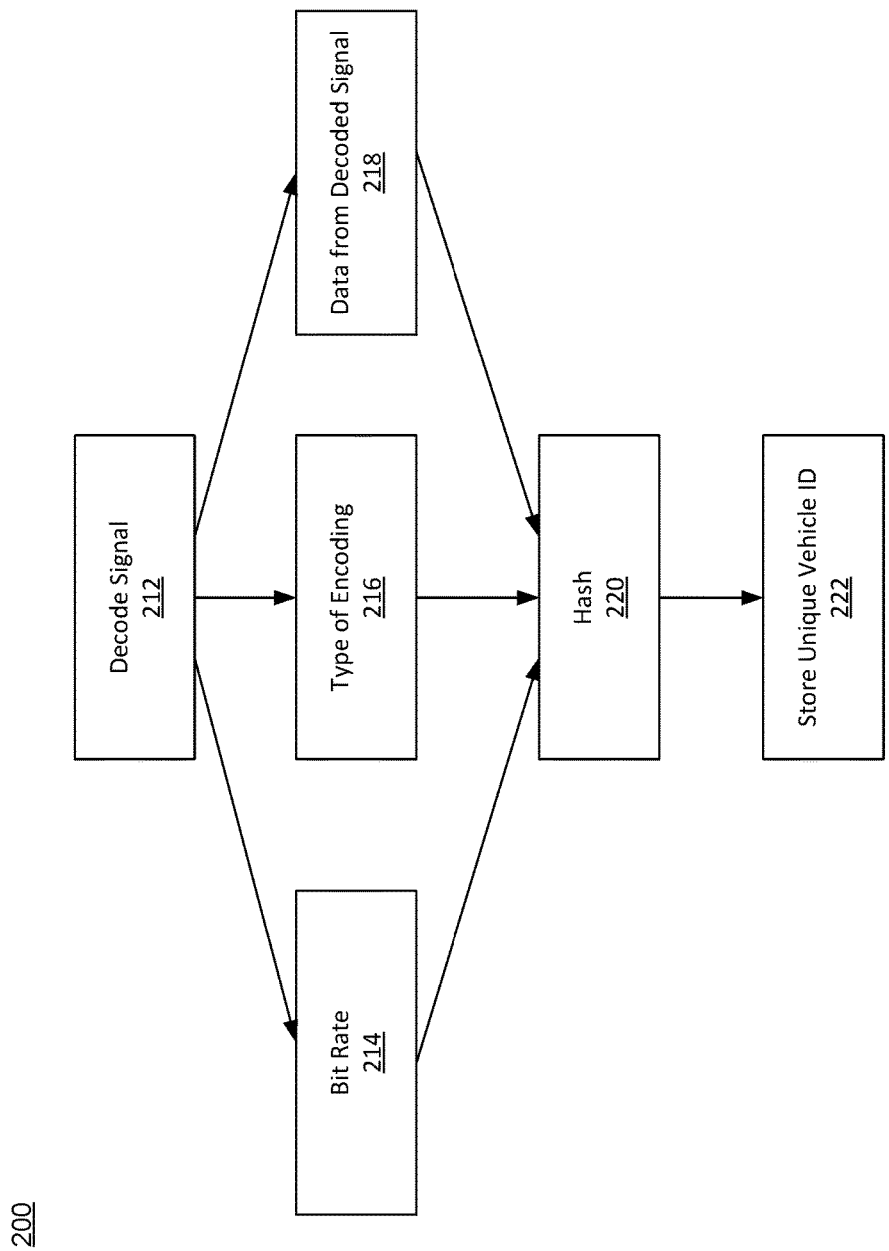
FIG. 2 is a flow chart illustrating a method of assigning a unique ID according to another embodiment.

FIG. 2 is a flow chart illustrating a method 200 of assigning and/or deriving a unique ID according to another embodiment. As discussed above, in some instances the method 200 can be performed by the processor 124 of the receiver 120. In other instances, the method 200 can be performed by the processor 134 of the server 130. In still other instances, a first portion of the method 200 can be performed by the processor 124 of the receiver 120 and a second portion of the method 200 can be performed by the processor 134 of the server 130.

The signal received from the sensor 122 can be decoded, at 212. Specifically, in some instances, the captured signal can be decoded into three parts including the following: bit rate of the received signal 214, encoding type associated with the received signal 216 (e.g., Manchester, PE, etc.), and the data from the decoded signal 218. The data from the decoded signal can be different depending on the type of signal received. For example, if the signal is a TPMS sensor signal, the data will include tire pressure signal data (e.g., a bit sequence associated with such data). For another example, if the signal is a Bluetooth® signal, the data will include Bluetooth® data (e.g., a bit sequence associated with Bluetooth® data).

The processing of a vehicle's signal into a unique vehicle ID can be done at 220 by, for example, hashing of 1) bit rate of the received signal 214, 2) encoding type of the received signal 216, and 3) the data from the received/decoded signal 218. By using these values as inputs into a hash function, a unique ID can be defined as an output from the hash function. This unique ID is then stored in a memory or database, at 222. When the unique ID is subsequently identified (e.g., based on the vehicle being within proximity of the sensor), the unique ID can be matched from the database and information and/or data associated with the unique ID can be retrieved, as discussed herein.

In other instances, any other suitable method can be used to process the bit rate, encoding type and/or data from the received signal into a unique ID. In still other instances, each of the bit rate, encoding type and data from the received signal are not used. In such instances, for example, one or two of the bit rate, encoding type and/or data from the received signal are processed to define the unique ID. In still other instances, other data derived from the vehicle's signal and/or from the sensor can be used to define the unique ID.

In some instances, a first static portion of the data signal from the decoded signal can be used in the hash function while a variable portion can be discarded. For example, in some instances a header portion of the data signal that is consistently provided in signals from the same sensor can be used, while a variable portion containing data that differs in each signal can be discarded. In such a manner, the static portion of the data from the decoded signal can be used as an input to the hash function to uniquely identify the vehicle even if different data is transmitted at different times.

In some instances, as discussed above, the unique vehicle ID can be identified and then correlated with other data (e.g., within a memory and/or database at receiver 120 and/or server 130) and used for a number of different purposes. For example, the vehicle ID can be used for proximity-deterministic targeted mobile advertising, geolocation, customer or client data (e.g., customer loyalty programs), a payment method, a product (e.g., a customer's order at a quick-service restaurant), duration of time within a geofenced area (e.g., parking garage), parking fee collection on a city street (e.g., eliminating parking meters), access to security areas (e.g. gated communities or sensors around a building's perimeter), changing billboards and external advertising to customize to individuals when their car is in proximity to the signage, targeted marking to mobile phone applications and/or the like.

In some instances, the unique vehicle ID can be used to determine a location of the vehicle. For example, based on location information (e.g., GPS coordinates) of a receiver and/or a multitude of receivers (e.g., in a geo-fenced area, in an array, on a map, etc.), the location of the vehicle can be determined. In some instances, a database can be used to search for and identify the last-known location of a vehicle ID (e.g., in the event of an emergency or car theft). In some instances, a message can be sent to a user notifying them that a vehicle ID associated with their vehicle has been located by one of the sensors. The message may contain a position on a graphical map, time and date stamp, and the GPS location of the sensor that detected a particular vehicle ID.

In some instances, a user can search a database for vehicle IDs, and/or a particular vehicle ID. This can allow a user to identify a position on a graphical map of the vehicle associated with a vehicle ID, time and date stamps for such positions, the location for each time the ID was detected by a sensor (e.g., for a specified time period), and/or the like.

Although various embodiments have been described as having particular features and/or combinations of components, other embodiments are possible having a combination of any features and/or components from any of embodiments as discussed above. For example, while described above as defining unique identifiers for vehicles, in other embodiments, the system can be used to intercept and/or receive a signal from any other suitable device to define a unique identifier for that device. For example, in some embodiments the receiver (e.g., receiver 120 of FIG. 1) can intercept and/or receive a signal emitted from a device carried and/or worn by an individual. Such a signal could be a Bluetooth® signal from a mobile device (e.g., as the user uses a Bluetooth® headset, a Bluetooth® headphones, a Bluetooth® connected smart watch, etc.), a Wi-Fi® signal from a mobile device, a cellular signal from the mobile device, and/or the like. Such a signal can be used to identify a unique identifier for the individual and/or phone as described above. Based on the unique identifier, data can be retrieved about the user and used for various purposes as described above. For example, based on intercepting and deriving a unique ID from a Bluetooth® signal from the connection between a mobile device and Bluetooth® headphones, a user may be granted access to a door or gate. For another example, based on intercepting and deriving a unique ID from a signal from the connection between the mobile device and a smart watch, targeted advertising can be provided to the user (e.g., on a billboard as the user comes into proximity of the billboard, on the mobile device, etc.).

While described above as the receiver 120 collecting data regarding the vehicle 110 and analyzing such data in substantially real-time when the vehicle 110 comes into range of the receiver 120, in other instances, a first receiver (or collection of receivers) can receive and store data associated with the vehicle and/or driver of the vehicle. This data can then be stored in a database and provided to or made available to a separate entity that can provide services to the vehicle and/or users of the vehicle based on that data. For example, the owner of a restaurant may own a single receiver or sensor in proximity of the restaurant. Based on the data previously received from other receivers and/or sensors, the owner of the restaurant can associate current customers (as identified from the restaurant sensor) with specific advertisements.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory;
a processor operatively coupled to the memory; and
a sensor operatively coupled to the processor, the sensor configured to intercept a wireless signal associated with a vehicle,
the processor configured to identify from the wireless signal (1) a bit rate of the wireless signal, (2) an encoding type associated with the wireless signal, and (3) data associated with the wireless signal,
the processor configured to calculate an identifier for the vehicle based on the bit rate, the encoding type and the data,
the processor configured to correlate within the memory the identifier with additional data associated with a user of the vehicle.

2. The apparatus of claim 1, wherein the wireless signal is generated by at least one of a device used to monitor operational data for the vehicle, a device to provide wireless data connections for the vehicle, a device to provide vehicleto-vehicle communication, a device to provide vehicle-to-infrastructure communication, or a device to provide toll information.

3. The apparatus of claim 1, wherein the wireless signal is generated by a tire pressure monitoring system sensor.

4. The apparatus of claim 1, wherein the processor is configured to calculate the identifier using a hash function with the bit rate, the encoding type and the data as inputs to the hash function.

5. The apparatus of claim 1, wherein the encoding type is phase encoding (PE).

6. The apparatus of claim 1, wherein the vehicle is a moving vehicle.

7. A method, comprising:
receiving, at a processor, an indication of a wireless signal intercepted from a vehicle using a sensor;
identifying, using the processor and from the indication of the wireless signal, (1) a bit rate of the wireless signal, (2) an encoding type associated with the wireless signal, and (3) data encoded within the wireless signal;
calculating, using the bit rate, the encoding type and the data as inputs to a hash function, an identifier for the vehicle; and
correlating, within a memory operatively coupled to the processor, the identifier with previously stored data associated with the vehicle.

8. The method of claim 7, wherein the correlating includes determining an identity of a user associated with the vehicle.

9. The method of claim 7, wherein the previously stored data associated with the vehicle includes at least one of:
an identification of an account associated with the vehicle; or
a vehicle identification number.

10. The method of claim 7, wherein the wireless signal is associated with a tire pressure monitoring system (TPMS) on the vehicle.

11. The method of claim 7, wherein the wireless signal is generated using at least one of:
a device used to monitor operational data for the vehicle;
a device to provide wireless data connections for the vehicle;
a device to provide vehicle-to-vehicle communication;
a device to provide vehicle-to-infrastructure communication; or
a device to provide toll information.

12. The method of claim 7, wherein the vehicle is a moving vehicle.

13. A non-transitory processor-readable medium storing code representing instructions to be executed by a processor, the code comprising code to cause the processor to:
intercept a wireless signal from a vehicle;
determine, from the wireless signal, (1) a bit rate of the wireless signal, (2) an encoding type associated with the wireless signal, and (3) data associated with the wireless signal;
calculate an identifier for the vehicle associated with the bit rate, the encoding type and the data; and
store the identifier in a memory storing additional data associated with the vehicle.

14. The non-transitory processor-readable medium of claim 13, wherein the wireless signal is generated using at least one of a device used to monitor operational data for the vehicle, a device to provide wireless data connections for the vehicle, a device to provide vehicle-to-vehicle communication, a device to provide vehicle-to-infrastructure communication, or a device to provide toll information.

15. The non-transitory processor-readable medium of claim 13, further comprising code to cause the processor to:
send a targeted advertisement to a user associated with the vehicle in response to identifying the user based on the identifier for the vehicle.

16. The non-transitory processor-readable medium of claim 13, further comprising code to cause the processor to:
identify, using the identifier, an identity of a user associated with the vehicle.

17. The non-transitory processor-readable medium of claim 13, further comprising code to cause the processor to:
determine an access authorization of the vehicle at a location.

18. The non-transitory processor-readable medium of claim 13, further comprising code to cause the processor to:
determine an access authorization of the vehicle at a location, the location includes at least one of a border crossing, a parking garage, or a gated community.

19. The non-transitory processor-readable medium of claim 13, further comprising code to cause the processor to:
send a signal to a user associated with the vehicle in response to identifying the user based on the identifier for the vehicle.

* * * * *